April 19, 1932.  J. A. WILSON  1,854,536
MAGNETIC ARC CONTROL
Filed Jan. 31, 1928  2 Sheets-Sheet 1
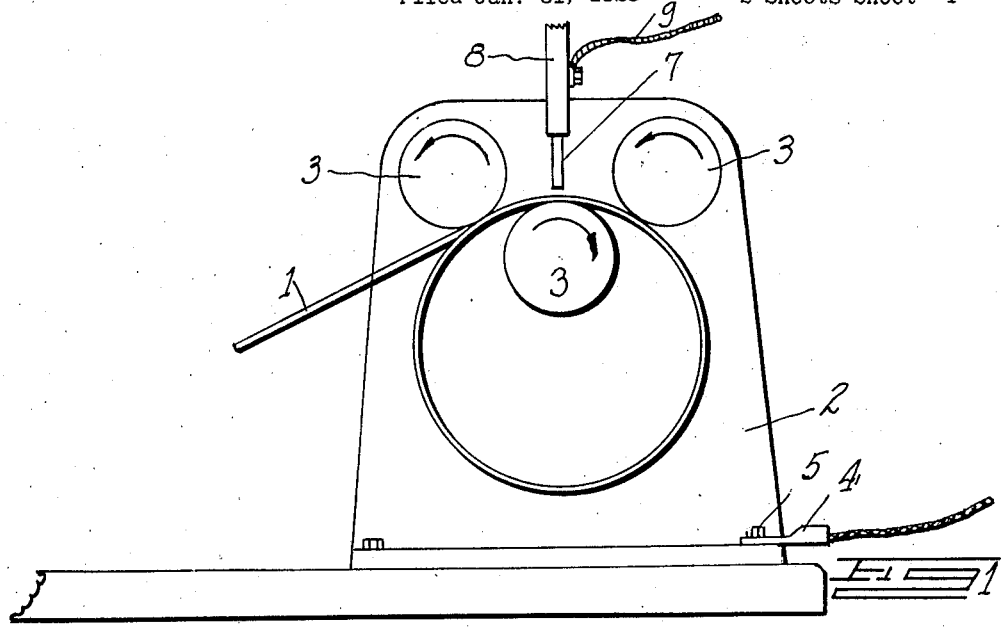
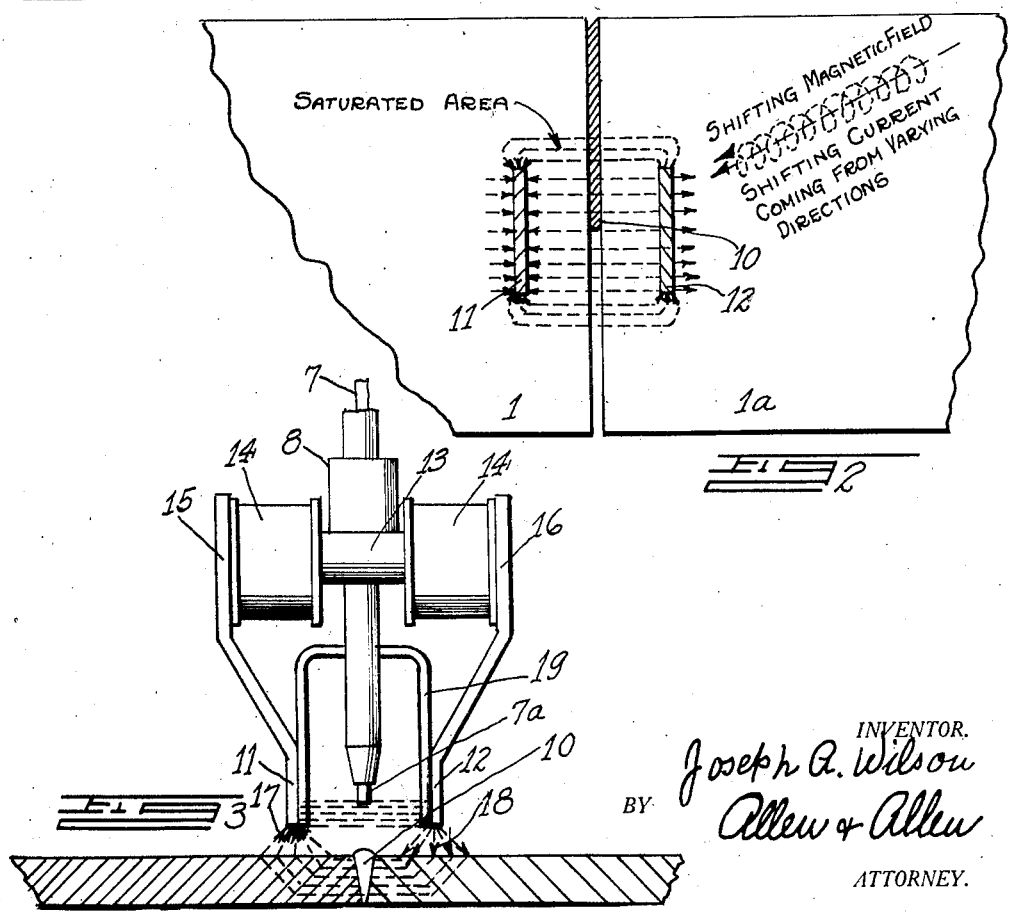
INVENTOR.
Joseph A. Wilson
BY Allen & Allen
ATTORNEY.

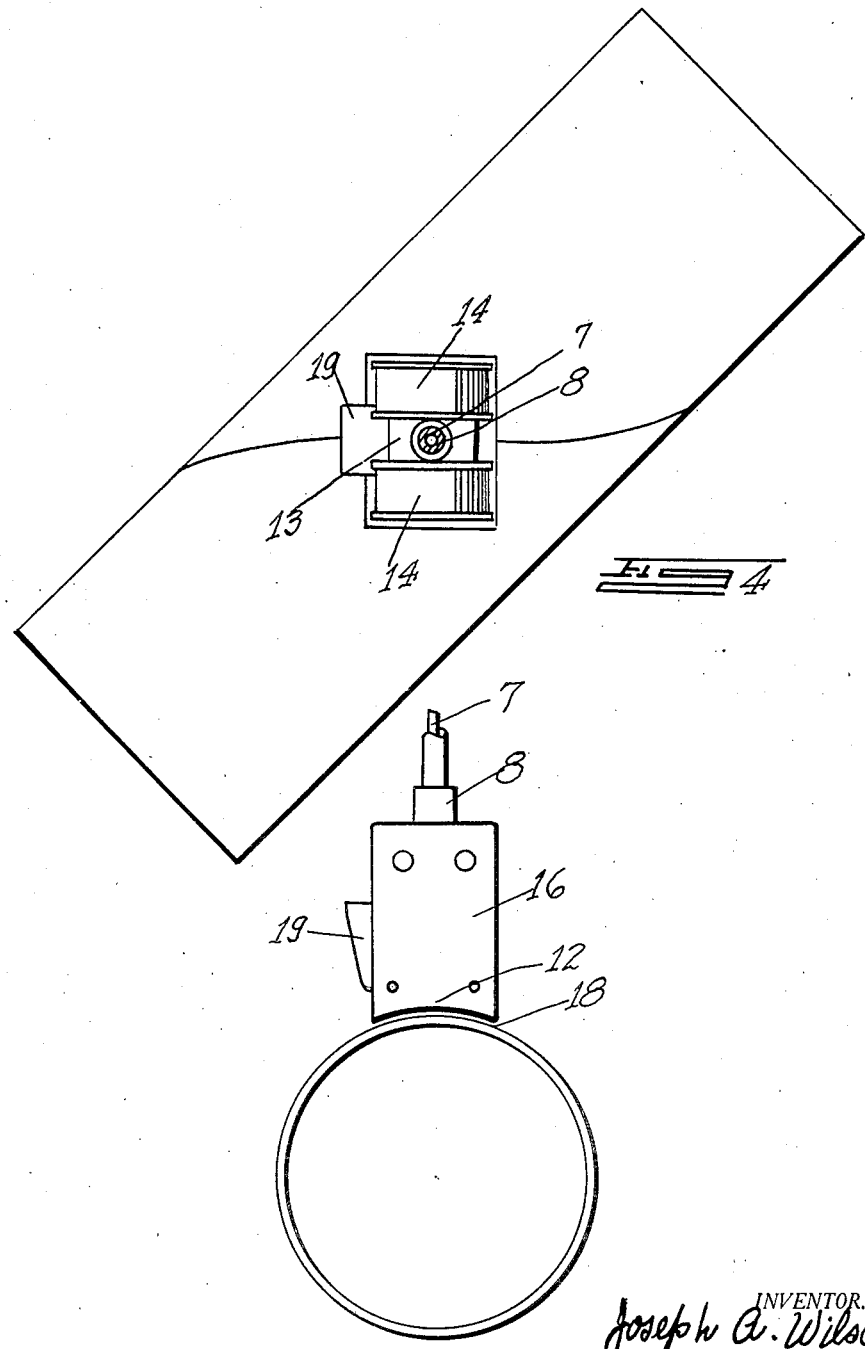

Patented Apr. 19, 1932

1,854,536

UNITED STATES PATENT OFFICE

JOSEPH A. WILSON, OF MIDDLETOWN, OHIO, ASSIGNOR TO THE AMERICAN ROLLING MILL COMPANY, OF MIDDLETOWN, OHIO, A CORPORATION OF OHIO

MAGNETIC ARC CONTROL

Application filed January 31, 1928. Serial No. 250,921.

My invention is adapted to welding by the use of the electric arc, and particularly to processes of welding in which continuous joints are made between strips of metal automatically or semi-automatically as in the manufacture of lengths of pipe from spirally wound and welded metallic strips or sheets. One of the chief difficulties encountered in such processes is due to the constant shifting of the arc to different points in the crater so that the action upon the work is not uniform and a smooth and satisfactory joint is difficult to obtain. Such shifting may be due in part to currents of air or other extraneous causes, but even when the arc is shielded therefrom, a great amount of shifting is still encountered due to varying magnetic forces acting upon the arc. This difficulty is present to some extent in the welding of stationary work to which a fixed contact may be made, but is greatly increased in automatic or semi-automatic operations in which the work travels. In a welding machine for these operations contact with the work is made by contact devices, generally more than one in number, over or beneath which the work passes. The shifting point of contact of itself causes a current to pass to the arc from different directions, since it will follow the path of least resistance in the material, and this effect is further heightened, when more than one contact device is used, by the shifting intensity of currents flowing to the arc from several points. These shifting currents create in and about the work shifting magnetic fluxes or fields which tend to divert the arc and to cause it to shift about. It is well known that an arc is surrounded by a magnetic field and that an outside magnetic influence will cause it to shift with respect to the electrode and the work.

It is an object of my invention to provide in a continuous arc welding device a means for positioning the arc with respect to the electrode and the work.

It is a further object of my invention to shield the positioned arc from the effects of shifting magnetic fields in and about the work. It is still a further object of my invention to provide, in a continuous and automatic or semi-automatic arc welding device for moving work, an arc for welding purposes which is controllable and which is shielded from outside influences, magnetic and otherwise, which would tend to divert it from its controlled position.

These and other objects of my invention will be apparent to one skilled in the art upon reading these specifications.

In the drawings:—

Figure 1 shows diagrammatically a continuous arc welding device.

Figure 2 is a plan view of two pieces of metal being welded, and shows diagrammatically the influence of shifting magnetic fields and the magnetic field produced by my control device.

Figure 3 is an elevation of my magnetic arc control showing a portion of the work in section.

Figure 4 is a vertical plan of the electrode and my control device seen from above as operating upon spiral or helical pipe.

Figure 5 is a side elevation of the same showing the pole pieces.

It has heretofore been known that the electric arc can be acted upon and diverted by magnetic means and devices have been developed for the magnetic control, for example, of the arcs of illuminating devices. Attempts have been made also to act upon the arc in arc welding processes by means of magnets, such as by placing one pole of an electro-magnet below the work, or by surrounding the electrode with a para-magnetic sheathing and winding it with coils of wire through which is passed an electric current. None of these attempts, however, have solved the problem of the shifting arc in arc welding apparatus. This is more particularly true of continuous arc welding machines with several points of contact over which the work shifts since, as is pointed out above, due to the varying contact efficiencies and the varying resistances of the moving work, the powerful welding currents approach the crater of the arc from several directions and over shifting paths. Powerful magnetic fields are set up by these currents and produce a disadvantageous shifting of the arc.

The ideal position of the arc is at a point in advance of the center line of the electrode. It is possible to give an arc this position momentarily by the use of a magnetic field of the proper intensity and direction, but if the arc is to be subjected to powerful and shifting magnetic fields from other sources the benefit of this positioning is largely lost.

The problem then is not only to give the arc its proper position by means of a magnetic field, but also to shield the arc from magnetic and other influences powerful enough to divert it substantially therefrom.

Reference to Figure 1 will show that in the ordinary continuous welding apparatus for moving work 1, there is a standard or frame 2, and work holders 3. In this instance, the work holders are in the form of rollers and serve also as contact members. A terminal 4 is connected to the frame 2 at any convenient point as at 5. A welded joint is made in the work by means of an electrode 7 passing through an electrode nozzle 8, and connected by means of a cable 9 to the other terminal of said source of electrical energy.

In Figure 2, assuming that the welding is being done at 10 in the work pieces 1 and 1a, I have shown diagrammatically that shifting magnetic fields due to shifting contacts and varying resistances in the moving work, can approach the point 10 from practically any angle. These shifting fields will divert the arc and prevent it from functioning properly. If, however, I am able to maintain about the point 10 an area of magnetic flux in the work of sufficient intensity so that the effect of the shifting magnetic fields becomes negligible, it will be seen that I have eliminated the effect of shifting magnetic fluxes and fields in and about the work. In my control apparatus I accomplish this result by positioning pole pieces represented diagrammatically in Figure 2 at 11 and 12, close to my work so as to produce therein and adjacent to the arc, an area saturated with a powerful flux, creating a magnetic field of such intensity that shifting magnetic fields formed in the work as above described cannot have any appreciable effect upon the arc.

Reference to Figure 3 will indicate the magnetic apparatus to which my pole pieces are connected for the purpose which I have just described. In this figure I show a core 13 of magnetic material through which the electrode nozzle 8 carrying the electrode 7 passes. On the two ends of this core I place coils 14 which are connected to a source of electric current which may be the same as that used in welding or may be separate. The windings of my coils 14 are of such character and are so connected together and to the source of electric current that the magnetic field created by one will reinforce that made by the other. These coils may be in series with the welding current, may be shunted across it, or may be formed of combined windings partly in shunt and partly in series with the welding current, or may, as indicated above, be connected with an outside source of current. Pole pieces 15 and 16 are attached to the end of the core 13 and are brought down so as to approach the electrode 7 and the work. I have indicated the ends of these pole pieces which are adjacent to the electrode and the work as 11 and 12 in Figures 2 and 3. The part 11 may be the south pole of my electro-magnet, and the part 12 the north pole thereof. The arc in Figure 3 will lie between the end of the electrode 7 designated as 7a and the work 1 at the point 10.

It will be obvious that th eaction of my electro-magnet is two-fold as follows: In the first place between parts 11 and 12 which are made to approach the electrode 7 there will be set up a powerful cross flux which will control the position of the arc. By causing this flux to take the proper direction and by making it of the required intensity, the arc can be positioned at a point in advance of the center with reference to the continuous weld being made. This position is the most advantageous. Secondly, the action of the poles 11 and 12 is to set up a magnetically saturated area in the work 1 (which is of magnetic material) and in which the lines of force which I have attempted to show diagrammatically by dotted lines, will be powerfully concentrated. This saturated area blots out the effect of shifting magnetic fields caused by varying paths of the welding current in the work from the contact members 3 to the point 10.

It will be observed that my pole pieces 11 and 12 do not make contact with the work 1 and are separated from it by a slight though appreciable air gap which I have indicated in Figure 3 as 17 and 18. The object of this air gap is to prevent such a shifting of the magnetic fluxes in the saturated area formed in the work by the action of the pole pieces as would in itself cause a shifting of the arc. Since there is no actual magnetic contact but an appreciable equalizing air gap between the pole pieces and the work the saturated magnetic flux or field in and about the work will be to all intents and purposes stationary.

For the further protection of my arc I prefer to attach to the pole pieces 11 and 12 a shield 19 which is of non-magnetic material such, for example, as copper, so that it will not interfere either with the cross flux controlling the position of the arc or the saturated area in the work which blots out the effect of shifting magnetic fields therein. The construction of this shield is such, however, that the arc will be protected from air currents and like outside influences.

The construction of my magnetic arc control will be more readily understood by reference to Figures 4 and 5 in which similar reference characters designate similar parts. It will be seen in Figure 4 that my core member 13 is flattened somewhat and is provided with a hole through which the electrode 7 and the sheath 8 pass.

In Figure 5 it will be seen that when my pole pieces 15 and 16 are designed for use on work such as spiral pipes, that the ends thereof 11 and 12 are given a concave form so that the air gaps 17 and 18 may be uniform all through the work.

Having thus described my invention, what I claim as new and desire to secure by Letters Patent, is:—

1. In an electric arc welding device for magnetizable material, means for controlling the arc comprising magnetic means for positioning said arc with reference to said work and means for creating in said work adjacent to said arc a magnetic flux of sufficient intensity to blot out the disturbing influence of shifting magnetic fields in said work caused by shifting electric or magnetic flow.

2. In an electric arc welding device for magnetizable material, means for controlling the arc comprising bi-polar magnetic means for positioning said arc with reference to said work, and bi-polar magnetic means for creating in said work adjacent said arc a magnetic flux of sufficient intensity to offset the disturbing influence of shifting magnetic fields in said work caused by shifting electric or magnetic flow.

3. In an electric arc welding device for magnetizible material, means for controlling the arc comprising electro-magnetic means for positioning said arc with reference to said work, and electro-magnetic means for creating in said work adjacent said arc a magnetic flux of sufficient intensity to offset the disturbing influence of shifting magnetic fields in said work caused by shifting electric or magnetic flow.

4. In an arc welding device, means for controlling the arc comprising opposite poles of an electro-magnet positioned on opposite sides of said arc and adjacent said work whereby the energizing of said electro-magnet will cause the formation of a magnetic flux between said pole pieces and surrounding said arc to cause said arc to lie at a point in advance of the center line of the electrode, and whereby an area of magnetic flux is produced in said work adjacent said arc which will eliminate the shifting of said arc by shifting magnetic fields in said work.

5. In an electric arc welding device for magnetizable material, means for controlling the arc comprising an electro-magnetic core with pole pieces placed diametrically one on each side of said arc so as to hold said arc in a position favorable for welding, and terminating adjacent to said work so as to create therein adjacent said arc a magnetic shield from the shifting influence of varying magnetic and electric lines of flow in said work.

6. In an arc welding device in combination with the work and an electrode, an electro-magnet having pole pieces on diametrically opposite sides of said electrode and separated from said work by an air gap of relatively small dimensions whereby said work becomes in substantial part a return path for the magnetic flux of said magnet.

7. In an arc welding device in combination with the work and an electrode, an electro-magnet having pole pieces on diametrically opposite sides of said electrode and separated from said work by an air gap, and a non-magnetic shield attached to and supported by said pole pieces, and arranged to close a gap between said pole pieces to screen an arc therebetween from air currents.

8. In an electric arc welding device for magnetizable work, in combination with said work an electrode and electrode sheath, the core of an electro-magnet, windings thereon and pole pieces attached to each end of said core, the ends of said pole pieces lying diametrically one on each side of said electrode and approaching said work.

9. In an electric arc welding device for magnetizable work in combination with said work an electrode, an electrode sheath, the core of an electro-magnet through which said electrode and sheath pass, windings on said core, and pole pieces attached to the ends thereof, said pole pieces being of an elongated form and being brought down to approach the end of said electrode and to lie diametrically one on each side thereof, the said ends being shaped with reference to said work so as to be separated therefrom by an air gap.

10. In an electric arc welding device for magnetizable work in combination with said work an electrode, an electrode sheath, the core of an electro-magnet through which said electrode and sheath pass, windings on said core, and pole pieces attached to the ends thereof, and pole pieces being of an elongated form and being brought down to approach the end of said electrode and to lie one on each side thereof, the said ends being shaped with reference to said work so as to be separated therefrom by an air gap, and a non-magnetic shield surrounding said electrode and attached to and supported by said pole pieces.

JOSEPH A. WILSON.